(12) United States Patent
Kamimura et al.

(10) Patent No.: US 9,533,631 B2
(45) Date of Patent: Jan. 3, 2017

(54) BATTERY MOUNTING STRUCTURE FOR VEHICLE

(71) Applicant: TOYOTA JIDOSHA KABUSHIKI KAISHA, Toyota-shi, Aichi-ken (JP)

(72) Inventors: Shinya Kamimura, Toyota (JP); Koki Ikeda, Toyota (JP); Kiyoshi Hokazono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/031,414

(22) PCT Filed: Dec. 2, 2014

(86) PCT No.: PCT/JP2014/081879
§ 371 (c)(1),
(2) Date: Apr. 22, 2016

(87) PCT Pub. No.: WO2015/098437
PCT Pub. Date: Jul. 2, 2015

(65) Prior Publication Data
US 2016/0288737 A1    Oct. 6, 2016

(30) Foreign Application Priority Data

Dec. 25, 2013  (JP) .................................. 2013-267966

(51) Int. Cl.
*B60K 1/04*      (2006.01)
*B60R 13/08*    (2006.01)
*H01M 2/10*    (2006.01)

(52) U.S. Cl.
CPC ............. *B60R 13/0869* (2013.01); *B60K 1/04* (2013.01); *H01M 2/1077* (2013.01);
(Continued)

(58) Field of Classification Search
CPC .............. B60K 1/04; B60K 2001/0438; H01M 2/1077; H01M 2/1083; H01M 2220/20
See application file for complete search history.

(56) References Cited

U.S. PATENT DOCUMENTS 5,543,204 A * 8/1996 Ray ........................... B32B 3/28
156/205
5,791,118 A * 8/1998 Jordan ...................... B32B 3/28
428/184

(Continued)

FOREIGN PATENT DOCUMENTS

JP         5013140 B2    8/2012

*Primary Examiner* — Hau Phan
*Assistant Examiner* — Jacob Meyer
(74) *Attorney, Agent, or Firm* — Oliff PLC

(57) ABSTRACT

A corrugated plate portion of a core panel is sandwiched between an upper panel and a lower panel, and is formed in a shape in which upwardly-facing concave portions, that open toward a side of the upper panel and extend in a vehicle transverse direction, and downwardly-facing concave portions, that open toward a side of the lower panel and extend in the vehicle transverse direction, are lined-up alternately. A sum of contact surface areas of the upper panel and bottom wall portion sides of the downwardly-facing concave portions at the corrugated plate portion is smaller than a sum of contact surface areas of the lower panel and bottom wall portion sides of the upwardly-facing concave portions at the corrugated plate portion.

3 Claims, 6 Drawing Sheets

(52) U.S. Cl.
CPC ... *H01M 2/1083* (2013.01); *B60K 2001/0438* (2013.01); *H01M 2220/20* (2013.01)

(56) References Cited

U.S. PATENT DOCUMENTS

| | | | | |
|---|---|---|---|---|
| 6,227,322 | B1* | 5/2001 | Nishikawa | B60R 16/04 180/65.1 |
| 6,743,504 | B1* | 6/2004 | Allen | B29C 70/446 428/188 |
| 7,654,352 | B2* | 2/2010 | Takasaki | B60K 1/04 180/65.1 |
| 8,210,301 | B2* | 7/2012 | Hashimoto | B60K 1/04 180/68.5 |
| 8,393,129 | B2* | 3/2013 | Arsene | E04C 2/34 52/783.17 |
| 8,403,090 | B2* | 3/2013 | Fujiwara | H01M 2/1077 180/68.5 |
| 8,833,499 | B2* | 9/2014 | Rawlinson | F41H 7/042 180/68.5 |
| 8,875,828 | B2* | 11/2014 | Rawlinson | B60K 1/04 180/68.5 |
| 8,936,125 | B2* | 1/2015 | Nakamori | B60K 1/04 180/68.5 |
| 8,951,653 | B2* | 2/2015 | Kurita | H01M 2/1077 248/222.12 |
| 9,045,030 | B2* | 6/2015 | Rawlinson | B60K 1/04 |
| 9,056,631 | B2* | 6/2015 | Nakamori | B60K 1/04 |
| 9,205,873 | B2* | 12/2015 | Maeda | B62D 21/15 |
| 9,227,582 | B2* | 1/2016 | Katayama | B60K 1/04 |
| 9,249,572 | B2* | 2/2016 | Neumayr | E04C 2/3405 |
| 9,273,870 | B2* | 3/2016 | Sulzer | F24D 3/14 |
| 9,281,505 | B2* | 3/2016 | Hihara | B60K 1/04 |
| 9,287,595 | B2* | 3/2016 | Fujii | H01M 2/1077 |
| 9,352,787 | B2* | 5/2016 | Hihara | B62D 25/20 |
| 9,413,045 | B2* | 8/2016 | Inoue | H01M 2/1077 |
| 9,440,523 | B2* | 9/2016 | Decker | H01M 2/0237 |
| 2004/0074206 | A1* | 4/2004 | Tanase | E04B 1/86 52/783.17 |
| 2004/0235315 | A1* | 11/2004 | Masui | B60K 1/04 439/34 |
| 2010/0080941 | A1* | 4/2010 | McCarville | B29C 70/30 428/34.1 |
| 2011/0143179 | A1 | 6/2011 | Nakamori | |
| 2012/0103714 | A1* | 5/2012 | Choi | B60K 1/04 180/68.5 |
| 2012/0160583 | A1* | 6/2012 | Rawlinson | F41H 7/042 180/68.5 |
| 2012/0183828 | A1* | 7/2012 | van den Akker | B60K 1/04 429/100 |
| 2012/0223113 | A1* | 9/2012 | Gaisne | H01M 2/1083 224/538 |
| 2012/0301765 | A1* | 11/2012 | Loo | H01M 2/1083 429/100 |
| 2012/0315508 | A1* | 12/2012 | Kurita | H01M 2/1077 429/7 |
| 2012/0321927 | A1* | 12/2012 | Loo | B60K 1/04 429/100 |
| 2014/0038030 | A1* | 2/2014 | Goesmann | H01M 2/1072 429/157 |
| 2014/0193683 | A1* | 7/2014 | Mardall | H01M 2/1077 429/99 |
| 2015/0030890 | A1* | 1/2015 | Inoue | H01M 2/1077 429/7 |
| 2015/0174996 | A1* | 6/2015 | Ikeda | B60K 1/04 180/68.5 |
| 2015/0180078 | A1* | 6/2015 | Ikeda | H01M 8/2475 180/68.5 |
| 2015/0249238 | A1* | 9/2015 | Andre | B60K 1/04 429/99 |
| 2016/0114667 | A1* | 4/2016 | Ikeda | B60K 1/04 180/68.5 |
| 2016/0114699 | A1* | 4/2016 | Hokazono | B60K 1/04 180/68.5 |

* cited by examiner

BATTERY MOUNTING STRUCTURE FOR VEHICLE

TECHNICAL FIELD

The present invention relates to a battery mounting structure for a vehicle.

BACKGROUND ART

Structures in which a battery for vehicle driving is mounted to the lower side of a vehicle body floor are known (see, for example, Patent Document 1).

PRIOR ART DOCUMENTS

Patent Documents

Patent Document 1: Japanese Patent No. 5013140

SUMMARY OF INVENTION

Technical Problem

However, there is room for improvement with regard to the point of suppressing the effects of the outside air temperature on the battery in a case in which a vehicle, that travels at a time of extreme cold or at a time of extreme heat, stops.

In view of the above-described circumstances, an object of the present invention is to provide a battery mounting structure for a vehicle that can suppress the effects of outside air temperature on a battery in a case in which a vehicle, that travels at a time of extreme cold or at a time of extreme heat, stops.

Solution to Problem

A battery mounting structure for a vehicle relating to a first aspect of the present invention comprises: a battery frame that is disposed at a vehicle body lower side of a floor panel, and that supports a battery for vehicle driving from a lower side, wherein the battery frame has: an upper plate portion that is made of resin, a lower plate portion that is made of resin and is disposed at a lower side of the upper plate portion, and a corrugated plate portion that is made of resin and is sandwiched between the upper plate portion and the lower plate portion, the corrugated plate portion having upwardly-facing concave portions, that open toward a side of the upper plate portion and extend in one direction, and downwardly-facing concave portions, that open toward a side of the lower plate portion and extend in the one direction, and the upwardly-facing concave portions and the downwardly-facing concave portions being lined-up alternately, and wherein a sum of contact surface areas of the upper plate portion and bottom wall portion sides of the downwardly-facing concave portions at the corrugated plate portion is smaller than a sum of contact surface areas of the lower plate portion and bottom wall portion sides of the upwardly-facing concave portions at the corrugated plate portion.

In accordance with the above-described structure, at the battery frame, the corrugated plate portion is sandwiched between the upper plate portion and the lower plate portion, and the battery for vehicle driving is supported from the lower side by this battery frame. Further, at the corrugated plate portion, upwardly-facing concave portions, that open toward the side of the upper plate portion and extend in one direction, and downwardly-facing concave portions, that open toward the side of the lower plate portion and extend in the one direction, are lined-up alternately, and the corrugated plate portion contacts the upper plate portion and the lower plate portion. Accordingly, in a case in which the vehicle travels at a time of extreme cold and heat of the battery for vehicle driving is transmitted to the upper plate portion, the heat that has been transmitted to the upper sides of the upwardly-facing concave portions is easily transmitted from the upper plate portion to the inner side space of the battery frame (the inner sides of the upwardly-facing concave portions). On the other hand, at the upper plate portion, the heat that has been transmitted to the upper sides of the bottom wall portions of the downwardly-facing concave portions is transmitted to the bottom wall portion sides of the downwardly-facing concave portions, and therefore, it is difficult for the heat to be transmitted to the inner side space of the battery frame.

Here, in the present invention, the sum of the contact surface areas of the upper plate portion and bottom wall portion sides of the downwardly-facing concave portions at the corrugated plate portion is smaller than the sum of contact surface areas of the lower plate portion and bottom wall portion sides of the upwardly-facing concave portions at the corrugated plate portion. Therefore, in a case in which the vehicle travels at a time of extreme cold, at the upper portion of the battery frame, the range, at which it is difficult for heat to be transmitted to the inner side space of the battery frame, is relatively narrow, and thus, heat from the battery is accumulated well at the inner side space of the battery frame (the inner side spaces of the upwardly-facing concave portions). Further, when the vehicle stops, the heat that has been accumulated in the inner side space of the battery frame is released to the upper side, and therefore, sudden cooling of the battery is suppressed even at a time of extreme cold.

On the other hand, when the vehicle travels at a time of extreme heat, due to traveling wind, it is difficult for heat from the road surface side to be transmitted to the lower plate portion. However, when the vehicle stops at a time of extreme heat, it is easy for heat from the road surface side to be transmitted to the lower plate portion. With respect thereto, in the present invention, the sum of the contact surface areas of the lower plate portion and the bottom wall portion sides of the upwardly-facing concave portions is relatively large. Therefore, in a case in which heat from the road surface side is transmitted to the lower plate portion when the vehicle stops at a time of extreme heat, the range at which it is difficult for heat to be transmitted to the inner side space of the battery frame is relatively wide. Accordingly, the transmission of heat from the road surface side to the inner side space of the battery frame is suppressed well, and accordingly, it is difficult for heat to be transmitted to the upper side of the battery frame. Therefore, a rise in temperature of the battery is effectively suppressed.

In a second aspect of the present invention, in the battery mounting structure for a vehicle relating to the first aspect, an opening width of the upwardly-facing concave portion as seen in the one direction is wider than a contact width of the upper plate portion and the bottom wall portion side of the downwardly-facing concave portion.

In accordance with the above-described structure, the opening width of the upwardly-facing concave portion is wider than the contact width of the upper plate portion and the bottom wall portion side of the downwardly-facing concave portion. Therefore, in a case in which heat is transmitted to the upper plate portion, the regions, at which it is easy to transmit heat to the inner side space of the battery frame, are wider (have wider widths) than at the adjacent positions that are regions at which it is difficult to transmit heat to the inner side space of the battery frame. Therefore, in a case in which the vehicle travels at a time of extreme cold, heat is accumulated effectively in the inner side space of the battery frame (the inner side spaces of the upwardly-facing concave portions).

In a third aspect of the present invention, in the battery mounting structure for a vehicle relating to the second aspect, an opening width of the downwardly-facing concave portion as seen in the one direction is narrower than the opening width of the upwardly-facing concave portion.

In accordance with the above-described structure, because the opening width of the downwardly-facing concave portion is narrower than the opening width of the upwardly-facing concave portion, in a case in which heat is transmitted to the lower plate portion, the regions, at which it is easy for heat to be transmitted to the inner side space of the battery frame, are relatively narrow (have narrow widths). Therefore, in a case in which heat from the road surface side is transmitted to the lower plate portion when the vehicle stops at a time of extreme heat, transmission of heat from the road surface side to the inner side space of the battery frame is suppressed effectively, and accordingly, it is more difficult for the heat to be transmitted to the upper side of the battery frame. Thus, a rise in temperature of the battery is suppressed more effectively.

Advantageous Effects of Invention

As described above, in accordance with the battery mounting structure for a vehicle of the present invention, there is the excellent effect that the effects of the outside air temperature on a battery in a case in which a vehicle, that travels at a time of extreme cold or at a time of extreme heat, stops can be suppressed.

DESCRIPTION OF EMBODIMENTS

First Embodiment

A battery mounting structure for a vehicle relating to a first embodiment of the present invention is described by using FIG. 1 through FIG. 4B. Note that arrow FR that is shown appropriately in these drawings indicates the vehicle front side, arrow UP indicates the vehicle upper side, and arrow W indicates the vehicle transverse direction.

Figure 1:
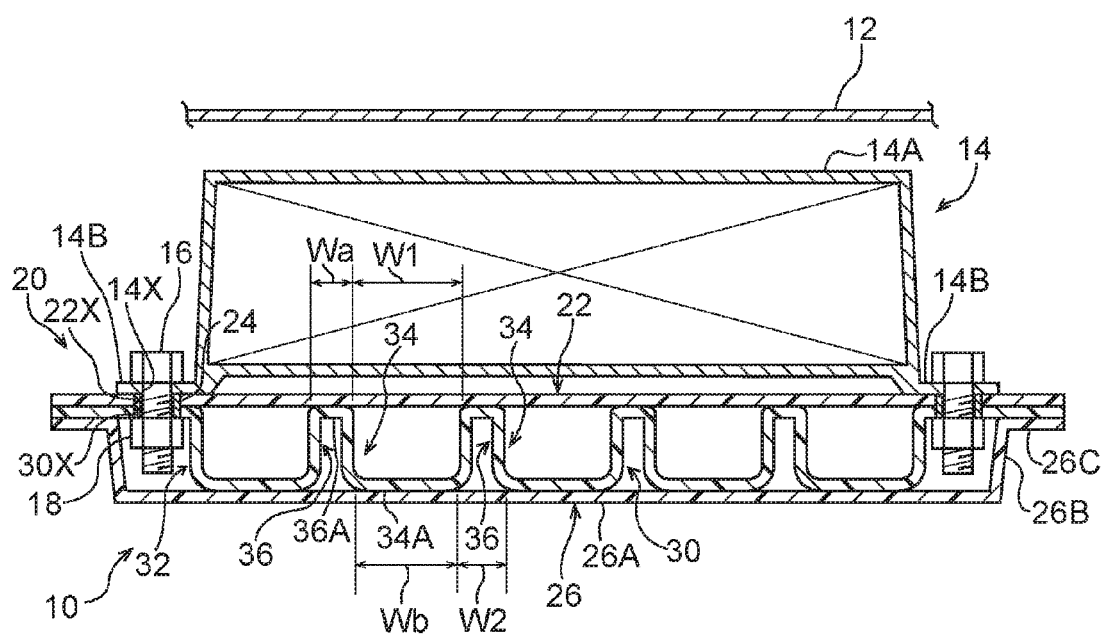
FIG. 1 is a vertical sectional view showing a battery mounting structure for a vehicle relating to a first embodiment of the present invention.

As shown in FIG. 1, a battery mounting structure 10 for a vehicle relating to the present embodiment, that is applied to a vehicle such as an electric automobile or the like, has a stack frame (battery frame) 20. The stack frame 20 is disposed at the vehicle body lower side of a floor panel 12 and supports a fuel cell stack 14, that serves as a battery, from the lower side.

Figure 2:
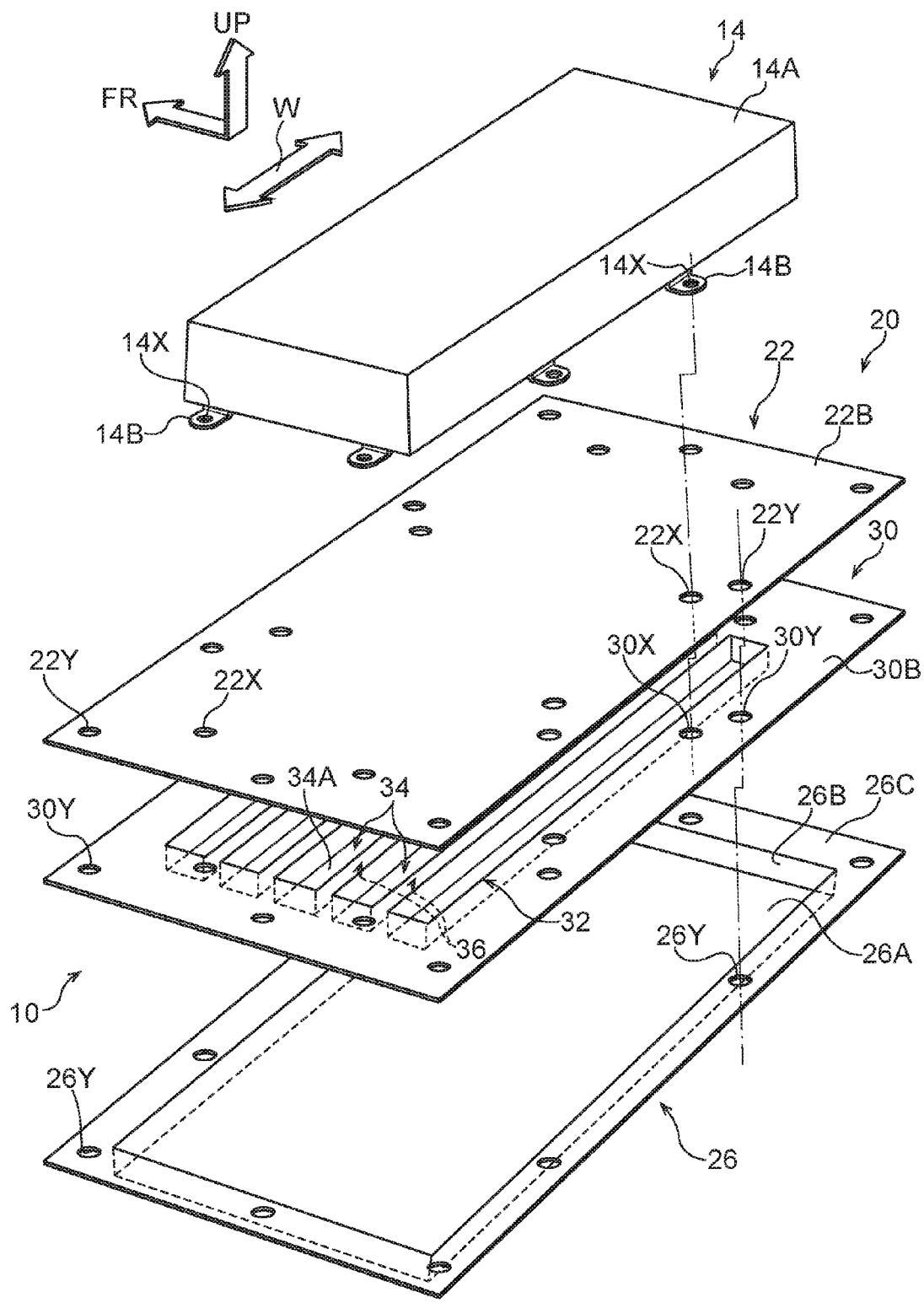
FIG. 2 is an exploded perspective view showing the battery mounting structure for a vehicle relating to the first embodiment of the present invention.

As shown in FIG. 1 and FIG. 2, at the fuel cell stack 14, a case portion 14A that covers a battery main body portion is formed in the shape of a rectangular box. Flange portions 14B jut-out from the front and rear end portions and the both side portions of the case portion 14A. Further, bolt insert-through holes 14X are formed so as to pass-through the flange portions 14B. Note that the case portion 14A and the flange portions 14B are formed of metal in the present embodiment, but may be formed of resin.

The flange portions 14B of the fuel cell stack 14 are superposed on an upper panel 22 that serves as an upper plate portion at the stack frame 20. The stack frame 20 is structured to include the upper panel 22, a lower panel 26 that serves as a lower plate portion, and a core panel 30 (an element that can be interpreted as an "intermediate member") that is sandwiched between the upper panel 22 and the lower panel 26. The upper panel 22, the lower panel 26 and the core panel 30 are all made of fiber reinforced resins (FRP) (as an example, are made of carbon fiber reinforced resins (CFRP)). A fiber reinforced resin is a resin that contains reinforcing fibers.

As shown in FIG. 2, the upper panel 22 is formed in a rectangular flat plate shape. First bolt insert-through holes 22X are formed so as to pass-through the region at the outer peripheral side of the upper panel 22, so as to correspond to the bolt insert-through holes 14X of the flange portions 14B of the fuel cell stack 14. Further, second bolt insert-through holes 22Y, for mounting to an under member (not shown) that structures the vehicle body, are formed at intervals in an outer peripheral end portion 22B of the upper panel 22. Note that bolt insert-through holes (not illustrated) are formed so as to pass-through the aforementioned under member at positions corresponding to the second bolt insert-through holes 22Y, and weld nuts (not illustrated) are fixed to the top surface of the outer peripheral portions of these bolt insert-through holes.

The lower panel 26 is disposed at the lower side of the upper panel 22, and is formed in the shape of a tray that is rectangular and whose vehicle body upper side is open. Namely, the lower panel 26 has a bottom portion 26A that is flat plate-shaped, a side wall portion 26B that is flat plate-shaped and stands erect integrally with the peripheral edge portion of the bottom portion 26A, and an overhanging portion 26C that is flat plate-shaped and juts-out integrally toward the opening outer side from the upper end portion of the side wall portion 26B. Bolt insert-through holes 26Y are formed so as to pass-through the overhanging portion 26C of the lower panel 26, so as to correspond to the second bolt insert-through holes 22Y at the outer peripheral end portion 22B of the upper panel 22.

Further, the core panel 30 is formed to the same size as the upper panel 22 and the lower panel 26 as seen in plan view. The outer peripheral portion of the core panel 30 is made to be flange-shaped over the entire periphery thereof, and is joined to the overhanging portion 26C of the lower panel 26 and the outer peripheral end portion 22B of the upper panel 22 while sandwiched therebetween.

First bolt insert-through holes 30X are formed in the outer peripheral portion of the core panel 30, so as to correspond to the bolt insert-through holes 14X of the fuel cell stack 14 and the first bolt insert-through holes 22X of the upper panel 22. Further, as shown in FIG. 1, weld nuts 18 are fixed to the bottom surface of the outer peripheral portion of the core panel 30, coaxially with the first bolt insert-through holes 30X at the outer peripheral portions of the first bolt insert-through holes 30X. Collar members 24, that are cylindrical and are made of metal, are coaxially inserted into the first bolt insert-through holes 22X of the upper panel 22 and the first bolt insert-through holes 30X of the core panel 30. Further, due to the shaft portions of bolts 16, that are inserted-through the bolt insert-through holes 14X of the fuel cell stack 14 and the collar members 24 from the vehicle body upper side, being screwed-together with the weld nuts 18, the flange portions 14B of the fuel cell stack 14 are fastened and fixed to the respective outer peripheral portions of the upper panel 22 and the core panel 30.

Further, as shown in FIG. 2, second bolt insert-through holes 30Y are formed in an outer peripheral end portion 30B of the core panel 30, so as to correspond to the second bolt insert-through holes 22Y of the upper panel 22 and the bolt insert-through holes 26Y of the lower panel 26. Collar members (not illustrated), that are cylindrical and are made of metal, are coaxially inserted into the bolt insert-through holes 26Y of the lower panel 26, the second bolt insert-through holes 30Y of the core panel 30, and the second bolt insert-through holes 22Y of the upper panel 22. Further, due to the shaft portions of the bolts, that are inserted-through the aforementioned collar members and the bolt insert-through holes of the aforementioned under member from the vehicle body lower side, being screwed-together with the aforementioned weld nuts that are fixed to the aforementioned under member, the outer peripheral end portion of the stack frame 20 is fastened and fixed to the aforementioned under member.

As shown in FIG. 1, the core panel 30 has a corrugated plate portion 32 that is inserted in the space that is surrounded by the bottom portion 26A and the side wall portion 26B of the lower panel 26. The corrugated plate portion 32 is sandwiched between the upper panel 22 and the lower panel 26, and is formed in a shape in which upwardly-facing concave portions 34, that open toward the side of the upper panel 22 and extend in the vehicle transverse direction (one direction), and downwardly-facing concave portions 36, that open toward the side of the lower panel 26 and extend in the vehicle transverse direction (the one direction), are lined-up alternately. The plural (five in the present embodiment) upwardly-facing concave portions 34 are set to a same opening width W1, and the plural (four in the present embodiment) downwardly-facing concave portions 36 are set to a same opening width W2.

The pair of side surfaces at each of the upwardly-facing concave portions 34 are inclined slightly in directions of moving away from one another while heading toward the vehicle body upper side, and the pair of side surfaces at each of the downwardly-facing concave portions 36 are inclined slightly in directions of moving away from one another while heading toward the vehicle body lower side. Further, bottom wall portions 34A of the upwardly-facing concave portions 34 planarly contact and are joined to (by an adhesive as an example in the present embodiment) the top surface of the lower panel 26, and bottom wall portions 36A of the downwardly-facing concave portions 36 planarly contact and are joined to (by an adhesive as an example in the present embodiment) the bottom surface of the upper panel 22. The corrugated plate portion 32 that is disposed in this way has the function of suppressing deformation of the stack frame 20 at the time of a side collision.

The sum of the surface areas of contact of the upper panel 22 and the bottom wall portion 36A sides of the downwardly-facing concave portions 36 at the corrugated plate portion 32, is smaller than the sum of the surface areas of contact of the lower panel 26 and the bottom wall portion 34A sides of the upwardly-facing concave portions 34 at the corrugated plate portion 32. Further, the surface area of the closed cross-sectional portion, that is structured by the upwardly-facing concave portion 34 and the upper panel 22, is wider than the surface area of the closed cross-sectional portion that is structured by the downwardly-facing concave portion 36 and the lower panel 26.

Further, the opening width W1 of the upwardly-facing concave portion 34 as seen in the vehicle transverse direction (the one direction) is wider than contact width Wa of the upper panel 22 and the bottom wall portion 36A side of the downwardly-facing concave portion 36. As an example, in the present embodiment, the opening width W1 is two or more times greater than the contact width Wa.

Moreover, the opening width W2 of the downwardly-facing concave portion 36 as seen in the vehicle transverse direction (the one direction) is narrower than the opening width W1 of the upwardly-facing concave portion 34. Further, the opening width W2 of the downwardly-facing concave portion 36 as seen in the vehicle transverse direction (the one direction) is narrower than contact width Wb of the lower panel 26 and the bottom wall portion 34A side of the upwardly-facing concave portion 34. As an example, in the present embodiment, the opening width W2 is less than one-half of the contact width Wb. Note that, the wider the contact width Wb, the more rigid the stack frame 20 is with respect to input from the vehicle lower side.

Operation/Effects

Operation and effects of the above-described embodiment are described next.

Figure 3A:
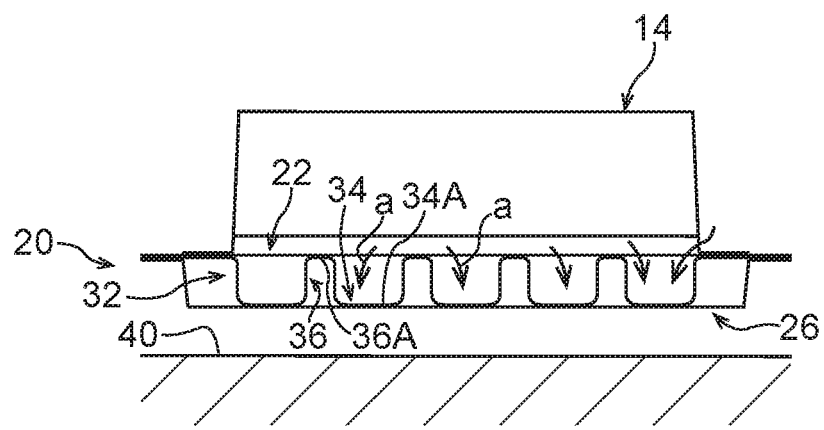
FIG. 3A is a schematic vertical sectional view that explains operation at a time of extreme cold at the battery mounting structure for a vehicle of FIG. 1, and shows the state at the time when a vehicle travels.

As shown schematically in FIG. 3A, in a case in which the vehicle travels at a time of extreme cold, such as in a cold geographical region or the like, and heat from the fuel cell stack 14 for vehicle driving is transmitted to the upper panel 22, the heat that is transmitted to the upper sides of the upwardly-facing concave portions 34 is easily transmitted from the upper panel 22 to the inner sides of the upwardly-facing concave portions 34 that are portions of the inner side space of the stack frame 20 (refer to arrows a). On the other hand, at the upper panel 22, the heat, that has been transmitted to the upper sides of the bottom wall portions 36A of the downwardly-facing concave portions 36, is transmitted to the bottom wall portion 36A sides of the downwardly-facing concave portions 36, and therefore, it is difficult for this heat to be transmitted to the inner side space of the stack frame 20.

Figure 3B:
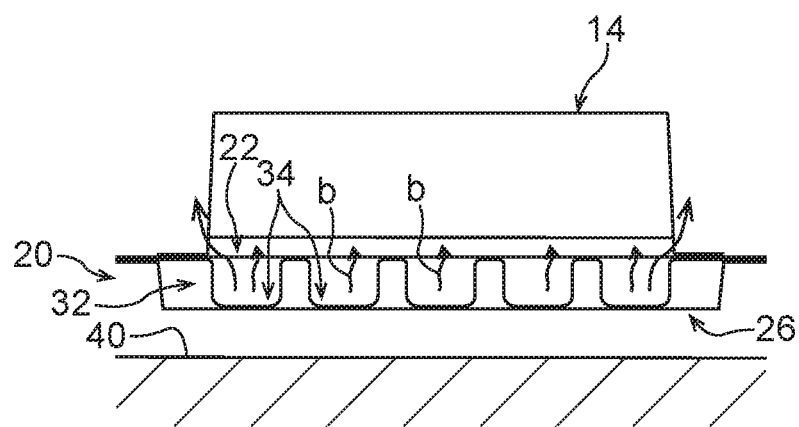
FIG. 3B is a schematic vertical sectional view that explains operation at a time of extreme cold at the battery mounting structure for a vehicle of FIG. 1, and shows the state at the time when the vehicle is stopped.

Here, in the present embodiment, the sum of the contact surface areas of the upper panel 22 and the bottom wall portion 36A sides of the downwardly-facing concave portions 36 at the corrugated plate portion 32 is smaller than the sum of the contact surface areas of the lower panel 26 and the bottom wall portion 34A sides of the upwardly-facing concave portions 34 at the corrugated plate portion 32. Therefore, in a case in which the vehicle travels at a time of extreme cold, the range at which it is difficult to transmit heat to the inner side space of the stack frame 20 at the upper portion of the stack frame 20 is relatively narrow, and therefore, heat (warm air) from the fuel cell stack 14 is accumulated well in the inner side space of the stack frame 20 (the inner side spaces of the upwardly-facing concave portions 34). Further, as shown in FIG. 3B, when the vehicle stops, the heat that has been accumulated in the inner side spaces of the stack frame 20 is released to the upper side, and therefore, (refer to arrows b), sudden cooling of the fuel cell stack 14 is suppressed even at a time of extreme cold (exhibiting of the temperature maintaining function).

Further, in the present embodiment, as shown in FIG. 1, the opening width W1 of the upwardly-facing concave portion 34 as seen in the vehicle transverse direction is wider than the contact width Wa of the upper panel 22 and the bottom wall portion 36A side of the downwardly-facing concave portion 36. Therefore, in a case in which heat is transmitted to the upper panel 22, the regions at which it is easy to transmit heat to the inner side space of the stack frame 20 are wider (have wider widths) than at the adjacent positions that are regions at which it is difficult to transmit heat to the inner side space of the stack frame 20. Therefore, in a case in which the vehicle travels at a time of extreme cold, heat is accumulated well in the inner side space of the stack frame 20 (the inner side spaces of the upwardly-facing concave portions 34).

Figure 4A:
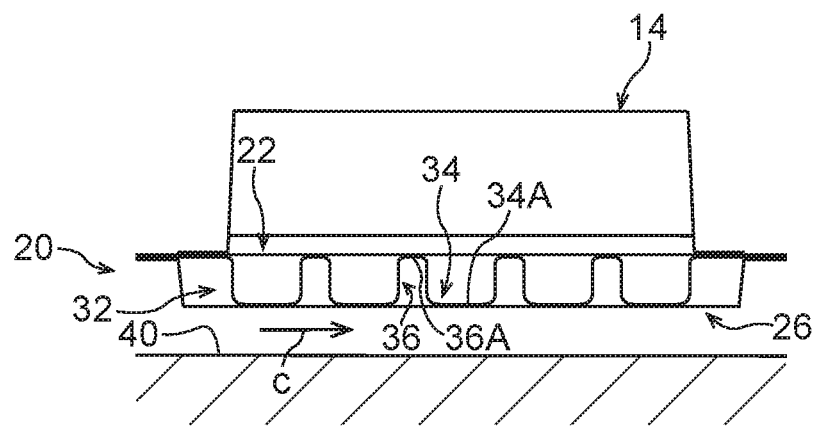
FIG. 4A is a schematic vertical sectional view that explains operation at a time of extreme heat at the battery mounting structure for a vehicle of FIG. 1, and shows the state at the time when the vehicle travels.
Figure 4B:
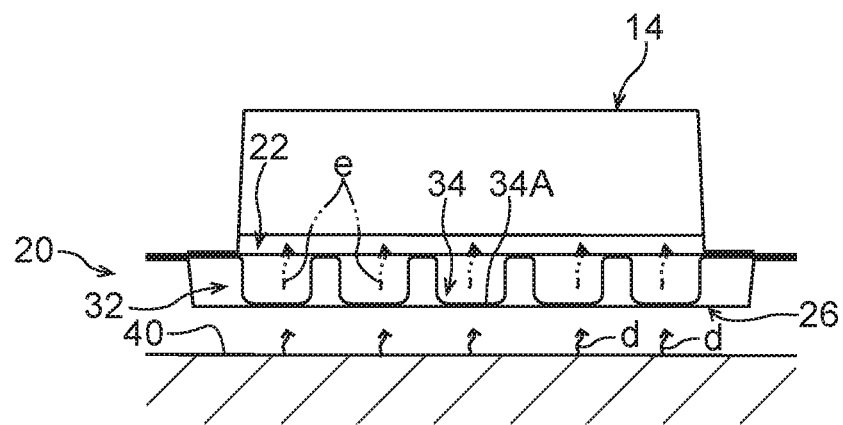
FIG. 4B is a schematic vertical sectional view that explains operation at a time of extreme heat at the battery mounting structure for a vehicle of FIG. 1, and shows the state at the time when the vehicle is stopped.

On the other hand, when the vehicle travels at a time of extreme heat such as in a hot geographical region or the like, as shown in FIG. 4A, due to traveling wind (refer to arrow c), it is difficult for heat from a road surface 40 side to be transmitted to the lower panel 26, but, when the vehicle stops at a time of extreme heat, it is easy for heat from the road surface 40 side to be transmitted to the lower panel 26. With respect thereto, in the present embodiment, the sum of the contact surface areas of the lower panel 26 and the bottom wall portion 34A sides of the upwardly-facing concave portions 34 is relatively large. Namely, the regions, that are two-layer structures of the lower panel 26 and the bottom wall portion 34A sides of the upwardly-facing concave portions 34, are wide. Therefore, in a case in which heat from the road surface 40 side is transmitted to the lower panel 26 when the vehicle stops at a time of extreme heat, the range at which it is difficult for heat to be transmitted to the inner side space of the stack frame 20 is relatively wide. Accordingly, as shown in FIG. 4B, the transmission of heat (refer to arrows d) from the road surface 40 side to the inner side space of the stack frame 20 is suppressed well. Note that the air layer at the inner side of the stack frame 20 also can function as a heat insulating layer.

For these reasons, it is difficult for heat to be transmitted to the upper side of the stack frame 20 (the transmission of heat such as arrows e is suppressed). Accordingly, a rise in temperature of the fuel cell stack 14 is effectively suppressed (exhibiting of the heat insulating effect).

Further, in the present embodiment, as shown in FIG. 1, the opening width W2 of the downwardly-facing concave portion 36 as seen in the vehicle transverse direction is more narrow than the opening width W1 of the upwardly-facing concave portion 34. Therefore, in a case in which heat is transmitted to the lower panel 26, the regions at which it is easy to transmit heat to the inner side space of the stack frame 20 are relatively narrow (have narrow widths). Thus, in a case in which heat (refer to arrows d) from the road surface 40 side is transmitted to the lower panel 26 when the vehicle stops at a time of extreme heat shown in FIG. 4B, the transmission of heat from the road surface 40 side to the inner side space of the stack frame 20 is suppressed effectively, and accordingly, it is more difficult for the heat to be transmitted to the upper side of the stack frame 20. Accordingly, a rise in temperature of the fuel cell stack 14 is suppressed more effectively.

As described above, in accordance with the battery mounting structure 10 for a vehicle relating to the present embodiment, effects of outside air temperature on the battery in a case in which a vehicle, that travels at a time of extreme cold or at a time of extreme heat, stops can be suppressed.

Second Embodiment

A battery mounting structure 50 for a vehicle relating to a second embodiment of the present invention is described next by using FIG. 5 and FIG. 6. The battery mounting structure 50 for a vehicle relating to the present embodiment is illustrated in an exploded perspective view in FIG. 5. Further, a schematic vertical sectional view, that explains operation at a time of extreme cold at the battery mounting structure 50 for a vehicle, is shown in FIG. 6.

As shown in these drawings, the battery mounting structure 50 for a vehicle differs from the first embodiment with regard to the point that through-holes 52 are formed in the upper panel 22 so that movement (refer to arrows m in FIG. 6) of heat at the inner side space of the stack frame 20 (the inner side spaces of the upwardly-facing concave portions 34) and at the upper side thereof is easy. The other structures are structures that are similar to the first embodiment. Accordingly, structural portions that are similar to the first embodiment are denoted by the same reference numerals, and description thereof is omitted.

Figure 5:
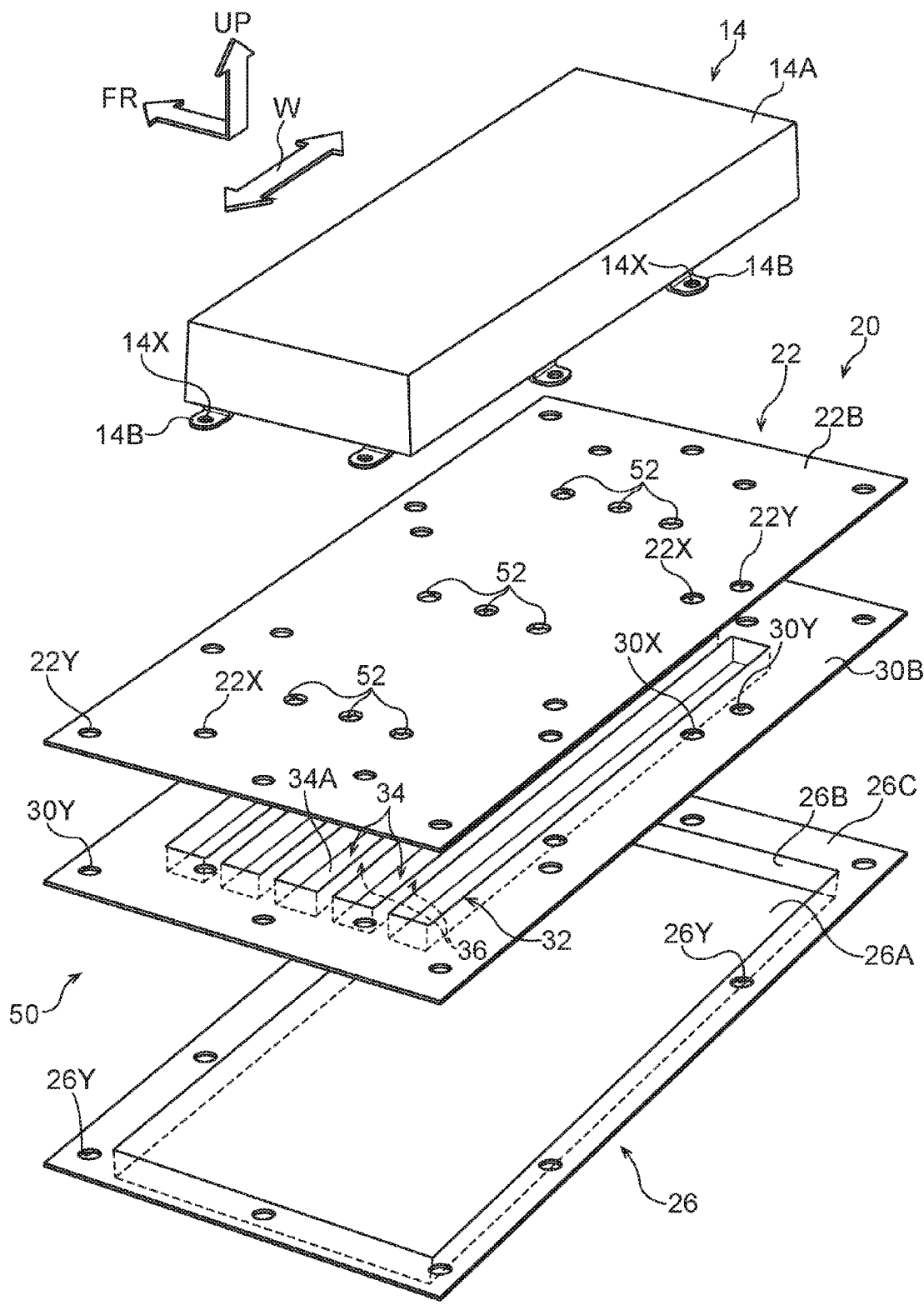
FIG. 5 is an exploded perspective view showing a battery mounting structure for a vehicle relating to a second embodiment of the present invention.
Figure 6:
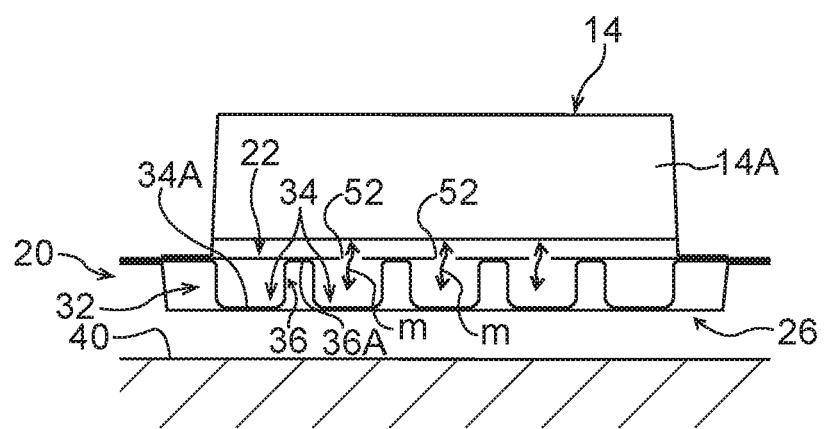
FIG. 6 is a schematic vertical sectional view that explains operation at a time of extreme cold at the battery mounting structure for a vehicle of FIG. 5.

As shown in FIG. 5 and FIG. 6, the through-holes 52 that are formed in the upper panel 22 are set at regions that communicate the inner side spaces of the upwardly-facing concave portions 34 and the space at the upper side thereof. In accordance with such a structure, when the vehicle travels at a time of extreme cold, heat can easily be accumulated in the inner side space of the stack frame 20 (the inner side spaces of the upwardly-facing concave portions 34). Further, when the vehicle stops at a time of extreme cold, heat can be easily released from the inner side space of the stack frame 20 (the inner side spaces of the upwardly-facing concave portions 34) toward the fuel cell stack 14 side. Accordingly, the stack frame 20 being cooled suddenly at a time of extreme cold can be suppressed more effectively.

Note that, when the through-holes 52 that are formed in the upper panel 22 are set so as to match a bottom surface external shape line at the case portion 14A of the fuel cell stack 14, the fuel cell stack 14 being cooled from the outer peripheral side at a time of extreme cold can be suppressed more effectively.

Supplemental Description of Embodiments

Note that, in the above-described embodiments, as shown in FIG. 2 and FIG. 5, the outer peripheral portion of the core panel 30 is made to be flange-shaped over the entire periphery thereof. However, the core panel (30) may be made to be flange-shaped, for example, only at the both end portions in the vehicle longitudinal direction.

Further, in the above-described embodiments, the upper panel 22, the lower panel 26 and the core panel 30 are all made of fiber reinforced resins. However, the upper plate portion, the lower plate portion and the corrugated plate portion that structure the stack frame may be formed of resins that do not contain reinforcing fibers, instead of fiber reinforced resins.

Further, as a modified example of the above-described embodiments, for example, in a case in which the number of openings (which is five in the case of the above-described embodiments) of the upwardly-facing concave portions is greater than the number of bottom wall portions (which is four in the case of the above-described embodiments) of the downwardly-facing concave portions, a structure can be employed in which the opening widths of the upwardly-facing concave portions as seen in the vehicle transverse direction (the one direction) are equal to or slightly narrower than the contact widths of the upper plate portion and the bottom wall portions sides of the downwardly-facing concave portions.

Further, as a modified example of the above-described embodiments, for example, in a case in which the number of openings (which is five in the case of the above-described embodiments) of the upwardly-facing concave portions is greater than the number of bottom wall portions (which is four in the case of the above-described embodiments) of the downwardly-facing concave portions, a structure can be employed in which the opening widths of the downwardly-facing concave portions as seen in the vehicle transverse direction (the one direction) are equal to the opening widths of the upwardly-facing concave portions.

Further, as a modified example of the above-described embodiments, for example, a structure can be employed in which any of the bottom wall portions of the plurally-set downwardly-facing concave portions does not contact the upper plate portion.

Further, as a modified example of the above-described embodiments, for example, a structure can be employed in which rib-shaped projecting portions are formed from the top surfaces of the bottom wall portions of the downwardly-facing concave portions, and these projecting portions are joined (are joined by being fused by heat as an example) to the top plate portion.

Further, in a case in which the plate thickness of the upper panel 22 that is shown in FIG. 1 and the like in the above-described embodiments is t1 and the plate thickness of the lower panel 26 is t2, these plate thicknesses may be set such that t1<t2. Note that, as a reference example that is not an embodiment of the present invention, a structure can be considered in which the sum of the contact surface areas of the upper plate portion and the bottom wall portion sides of the downwardly-facing concave portions at the corrugated plate portion is equivalent to or greater than the sum of the contact surface areas of the lower plate portion and the bottom wall portion sides of the upwardly-facing concave portions at the corrugated plate portion, and, in a case in which the plate thickness of the upper plate portion is ta and the plate thickness of the lower plate portion is tb, these plate thicknesses are set such that ta<tb.

Further, in a case in which the plate thickness of the bottom wall portion 36A of the downwardly-facing concave portion 36 in the above-described embodiments is t3 and the plate thickness of the bottom wall portion 34A of the upwardly-facing concave portion 34 is t4, these plate thickness may be set such that t3<t4. Note that, as a reference example that is not an embodiment of the present invention, a structure can be considered in which the sum of the contact surface areas of the upper plate portion and the bottom wall portion sides of the downwardly-facing concave portions at the corrugated plate portion is equivalent to or greater than the sum of the contact surface areas of the lower plate portion and the bottom wall portion sides of the upwardly-facing concave portions at the corrugated plate portion, and, in a case in which the plate thickness of the bottom wall portion of the downwardly-facing concave portion is tc and the plate thickness of the bottom wall portion of the upwardly-facing concave portion is td, these plate thicknesses are set such that tc<td.

Further, although the "one direction" that is recited in the first aspect and the like of the present invention is the vehicle transverse direction in the above-described embodiments, the one direction may be a direction other than the vehicle transverse direction such as, for example, the vehicle longitudinal direction or the like. Further, the "battery" that is recited in the first aspect of the present invention may be a primary battery, or may be a secondary battery.

Note that the above-described embodiments and above-described plural modified examples can be implemented by being combined appropriately.

Although examples of the present invention have been described above, the present invention is not limited to the above, and can, of course, be implemented by being modified in various ways other than the above within a scope that does not depart from the gist thereof.

Note that the disclosure of Japanese Patent Application No. 2013-267966 is, in its entirety, incorporated by reference into the present specification.

The invention claimed is:

1. A battery mounting structure for a vehicle, comprising:
   a battery frame that is disposed at a vehicle body lower side of a floor panel, and that supports a battery for vehicle driving from a lower side,
   wherein the battery frame has:
   an upper plate portion that is made of resin,
   a lower plate portion that is made of resin and is disposed at a lower side of the upper plate portion, and
   a corrugated plate portion that is made of resin and is sandwiched between the upper plate portion and the lower plate portion, the corrugated plate portion having upwardly-facing concave portions, that open toward a side of the upper plate portion and extend in one direction, and downwardly-facing concave portions, that open toward a side of the lower plate portion and extend in the one direction, and the upwardly-facing concave portions and the downwardly-facing concave portions being lined-up alternately; and
   wherein a sum of contact surface areas of the upper plate portion and bottom wall portion sides of the downwardly-facing concave portions at the corrugated plate portion is smaller than a sum of contact surface areas of the lower plate portion and bottom wall portion sides of the upwardly-facing concave portions at the corrugated plate portion.

2. The battery mounting structure for a vehicle of claim 1, wherein an opening width of the upwardly-facing concave portion as seen in the one direction is wider than a contact width of the upper plate portion and the bottom wall portion side of the upwardly-facing concave portion.

3. The battery mounting structure for a vehicle of claim 2, wherein an opening width of the downwardly-facing concave portion as seen in the one direction is narrower than the opening width of the upwardly-facing concave portion.

* * * * *